United States Patent
Li et al.

(10) Patent No.: US 9,087,527 B1
(45) Date of Patent: Jul. 21, 2015

(54) APPARATUS AND METHOD FOR MIDDLE SHIELD CONNECTION IN MAGNETIC RECORDING TRANSDUCERS

(71) Applicant: Western Digital (Fremont), LLC, Fremont, CA (US)

(72) Inventors: Shaoping Li, San Ramon, CA (US); Steven C. Rudy, San Jose, CA (US); Gerardo A. Bertero, Redwood City, CA (US); Yunfei Ding, Fremont, CA (US); Christopher L. Beaudry, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/526,335

(22) Filed: Oct. 28, 2014

(51) Int. Cl.
*G11B 5/187* (2006.01)
*G11B 5/33* (2006.01)

(52) U.S. Cl.
CPC ............... *G11B 5/1871* (2013.01); *G11B 5/33* (2013.01)

(58) Field of Classification Search
CPC .... G11B 5/1278; G11B 5/315; G11B 5/3116; G11B 2005/0021; G11B 5/314; G11B 5/3123
USPC ......................................................... 360/319
See application file for complete search history.

(56) References Cited

U.S. PATENT DOCUMENTS

| | | |
|---|---|---|
| 4,012,781 A | 3/1977 | Lin |
| 5,229,901 A | 7/1993 | Mallary |
| 5,270,892 A | 12/1993 | Naberhuis |
| 5,309,305 A | 5/1994 | Nepela et al. |
| 5,388,014 A | 2/1995 | Brug et al. |
| 5,684,658 A | 11/1997 | Shi et al. |
| 5,696,654 A | 12/1997 | Gill et al. |
| 5,721,008 A | 2/1998 | Huang et al. |
| 5,796,535 A | 8/1998 | Tuttle et al. |
| 5,831,888 A | 11/1998 | Glover |
| 5,963,400 A | 10/1999 | Cates et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |

(Continued)

OTHER PUBLICATIONS

Shaoping Li, et al., U.S. Appl. No. 13/928,799, filed Jun. 27, 2013, 27 pages.

(Continued)

*Primary Examiner* — Mark Blouin

(57) ABSTRACT

A read transducer having a first read sensor, a second read sensor, and a first middle shield is provided. The second read sensor is disposed in a down track direction from the first read sensor. The first middle shield is disposed between the first read sensor and the second read sensor. The first middle shield includes a first metallic middle shield layer disposed between the first read sensor and the second read sensor, a second metallic middle shield layer disposed between the first metallic middle shield layer and the second read sensor, and a first magnetic-spacer layer disposed between the first metallic middle shield layer and the second metallic middle shield layer. The first metallic middle shield layer and the second metallic middle shield layer have substantially the same polarity.

20 Claims, 7 Drawing Sheets

(56) References Cited

U.S. PATENT DOCUMENTS

| | | |
|---|---|---|
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,071,007 A | 6/2000 | Schaenzer et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,104,562 A | 8/2000 | Ottesen et al. |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,154,335 A | 11/2000 | Smith et al. |
| 6,157,510 A | 12/2000 | Schreck et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,191,925 B1 | 2/2001 | Watson |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,216,242 B1 | 4/2001 | Schaenzer |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,271,998 B1 | 8/2001 | Coehoorn et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,311,551 B1 | 11/2001 | Boutaghou |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,362,528 B2 | 3/2002 | Anand |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,449,131 B2 | 9/2002 | Guo et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,333 B1 | 12/2002 | Han et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |

(56) References Cited

U.S. PATENT DOCUMENTS

| | | |
|---|---|---|
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,674,618 B2 | 1/2004 | Engel et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,842,312 B1 | 1/2005 | Alstrin et al. |
| 6,859,343 B1 | 2/2005 | Alfoqaha et al. |
| 6,859,997 B1 | 3/2005 | Tong et al. |
| 6,861,756 B2 | 3/2005 | Saito et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,253 B1 | 5/2005 | Rogers et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,971 B2 * | 1/2006 | Lin et al. ........................ 360/322 |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,106,549 B2 | 9/2006 | Asakura |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,807 B1 | 3/2007 | Liikanen et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,259,927 B2 | 8/2007 | Harris |
| 7,271,970 B2 | 9/2007 | Tsuchiya |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |

(56) References Cited

U.S. PATENT DOCUMENTS

| | | |
|---|---|---|
| 7,307,818 B1 | 12/2007 | Park et al. |
| 7,310,204 B1 | 12/2007 | Stoev et al. |
| 7,315,072 B2 | 1/2008 | Watanabe |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,168 B2 | 5/2008 | Wu et al. |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,405,907 B2 | 7/2008 | Raastad |
| 7,408,730 B2 | 8/2008 | Yamagishi |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,632 B2 | 10/2008 | Li et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,868,362 B2 | 1/2011 | Randazzo et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,139,301 B1 | 3/2012 | Li et al. |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,228 B2 | 6/2012 | Maat et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,240,545 B1 | 8/2012 | Wang et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |

(56) References Cited

U.S. PATENT DOCUMENTS

| | | |
|---|---|---|
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,384,220 B2 | 2/2013 | Saito et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,157 B2 | 9/2013 | Cole et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,873,204 B1 * | 10/2014 | Gao et al. ............ 360/319 |

(56) References Cited

U.S. PATENT DOCUMENTS

| | | |
|---|---|---|
| 8,891,207 B1 | 11/2014 | Li |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2013/0277863 A1 | 10/2013 | Zhong et al. |
| 2013/0279311 A1 | 10/2013 | Hurley et al. |
| 2014/0154529 A1 | 6/2014 | Yang et al. |
| 2014/0175050 A1 | 6/2014 | Zhang et al. |

OTHER PUBLICATIONS

Steven C. Rudy, et al., U.S. Appl. No. 14/045,022, filed Oct. 3, 2013, 31 pages.

Shaoping Li, et al., U.S. Appl. No. 14/046,771, filed Oct. 4, 2013, 43 pages.

Shaoping Li, et al., U.S. Appl. No. 14/097,157, filed Dec. 4, 2013, 38 pages.

* cited by examiner

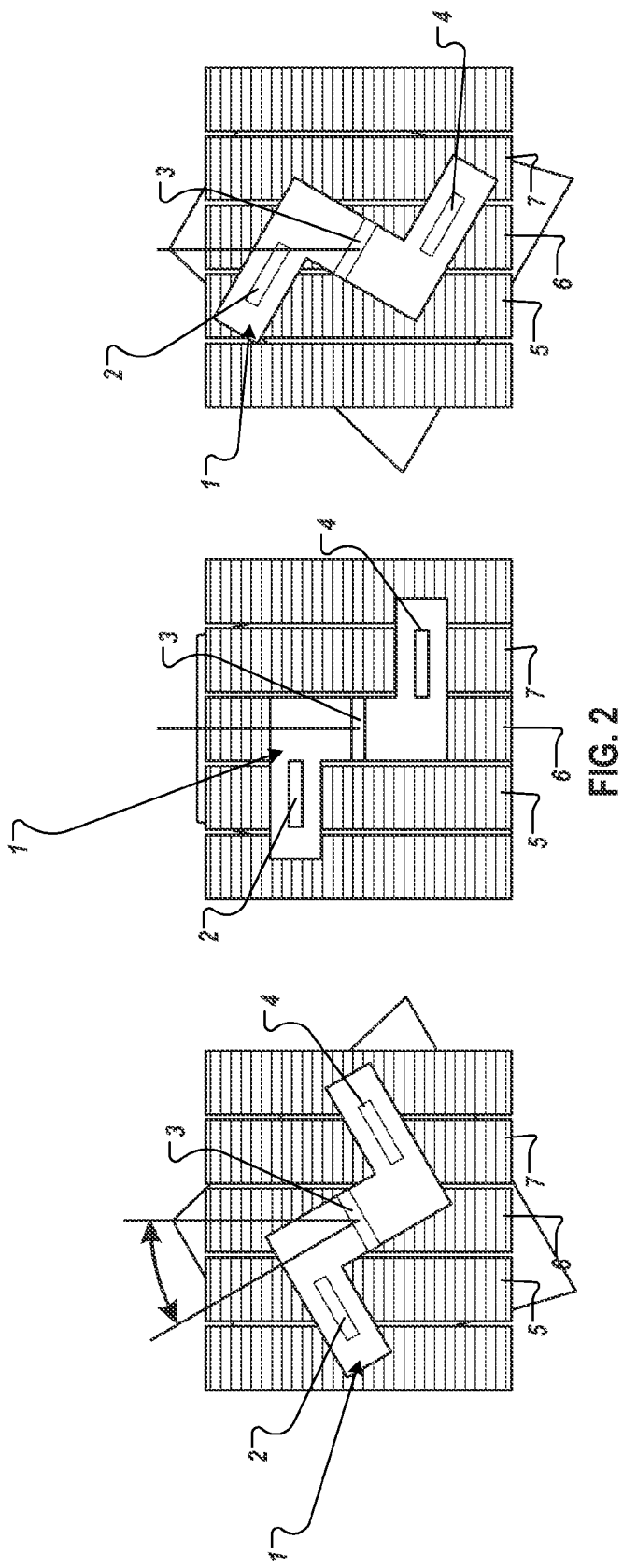

APPARATUS AND METHOD FOR MIDDLE SHIELD CONNECTION IN MAGNETIC RECORDING TRANSDUCERS

BACKGROUND

FIGS. 1A-1B illustrate a related-art two-dimensional magnetic recording (TDMR) transducer 1. Specifically, FIG. 1A illustrates a plan view of the related-art read transducer 1 and FIG. 1B illustrates a schematic view of the related-art two-dimensional read transducer 1. As illustrated, the related-art read transducer may include the two outer shields (15, 50), four mid-shields (20, 25, 55, 36), and three read sensors (80, 85, 90), each having to terminals for a total of six terminals (5, 10, 30, 35, 40, 45). The two outer shields include a first outer shield (S1) 15 and a second outer shields (S2) 50. The four mid-shields include a first mid-shield (MS1) 55, a second mid-shield (MS2) 20, a third mid-shield (MS3) 60, and a fourth mid-shield (MS4) 25.

The three read sensors (illustrated in FIG. 1B) include a first read sensor (R1) 80, a second read sensor (R2) 85, and a third read sensor (R3) 90. The first read sensor (R1) 90 includes a negative terminal (R1−) 5 and a positive terminal (R1+) 45. The second read sensor (R2) also includes a negative terminal (R2−) 10 and a positive terminal (R2+) 35. Further, the first read sensor (R3) includes a negative terminal (R3−) 30 and a positive terminal (R3+) 40.

Each of the shields (i.e. outer shields 15, 50 and mid-shields 55, 20, 60, 25) has an electrical polarity. As illustrated in FIG. 1B, adjacent mid-shields (55, 20, 60, 25) have opposite polarities. In other words, the first mid-shield (MS1) 55 has a positive polarity and the second mid-shield (MS2) 20 has a negative polarity. Further, the third mid-shield (MS3) 60 also has a positive polarity and the fourth mid-shield (MS4) 25 has a negative polarity.

Referring back to FIG. 1A, all layers of the TDMR transducer 1 having a negative polarity (e.g. R1− 5, R2− 10, S1 15, MS2 20, MS4 25 and R3− 30) overlap a contact pad located on the same first side 70 of the TDMR transducer 1. Further, all layers of the TDMR transducer 1 having a positive polarity (e.g. R2+ 35, R3+ 40, R1+ 45, S2 50, MS1 55 and MS3 60) overlap a contact pad located on the same second side 70 of the TDMR transducer 1.

By employing multiple sensor array designs, TDMR technology may enable multi-terabit density recording. In principle TDMR operation schemes may require the read sensor array structure of the TDMR transducer be longitudinally aligned along the cross track direction with little or no separation to allow different signals to be obtained at different data track locations simultaneously during read back process. However, a TDMR transducer 1 may suffer a misalignment between adjacent sensor locations 2, 3, 4 and the actual tracks 5, 6, 7 of interests due some skew angle and radius conditions, as illustrated in FIG. 2.

Smaller separation vertical separation between adjacent sensors may reduce a skew angle causing misalignment shift. However, when the multiple sensors are brought together closer and closer, the capacitive coupling noise or the crosstalk may become a major concern especially when the vertical separation between adjacent sensors is reduced. Accordingly, what is needed is a system and method for improving the performance of a magnetic recording read transducer, particular for TDMR.

BRIEF DESCRIPTION OF SEVERAL VIEWS OF THE DRAWINGS

FIG. 2 is a schematic view illustrating track misalignment based on skew angle and radius conditions.

DETAILED DESCRIPTION OF THE EXEMPLARY IMPLEMENTATIONS

Figure 1A:
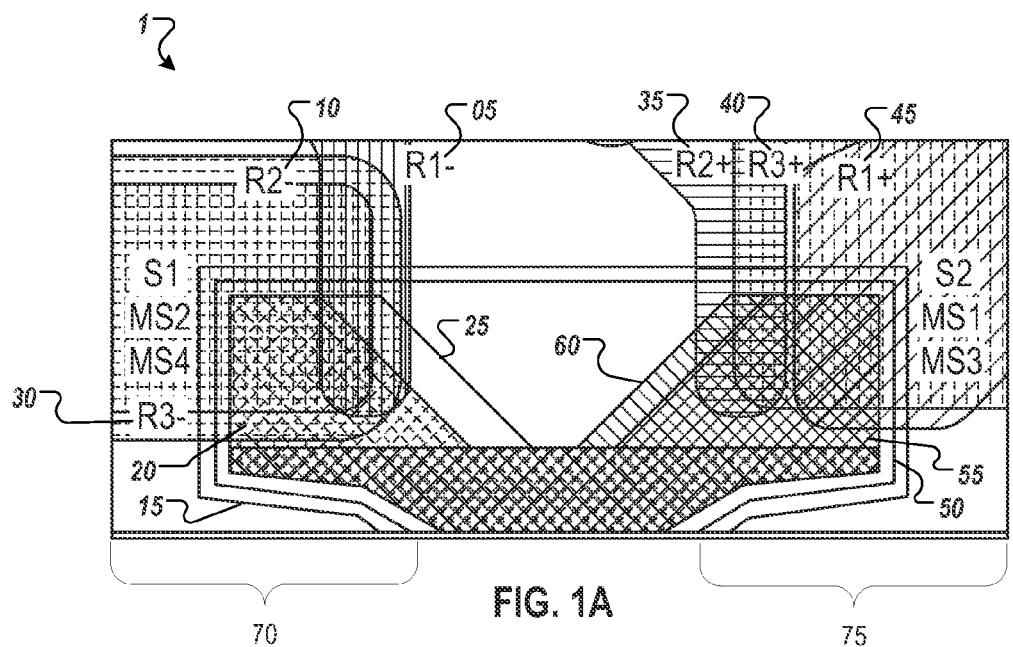
FIG. 1A illustrates a plan view of the related-art read transducer 1 and FIG. 1B illustrates a schematic view of the related-art two-dimensional read transducer 1.
Figure 1B:
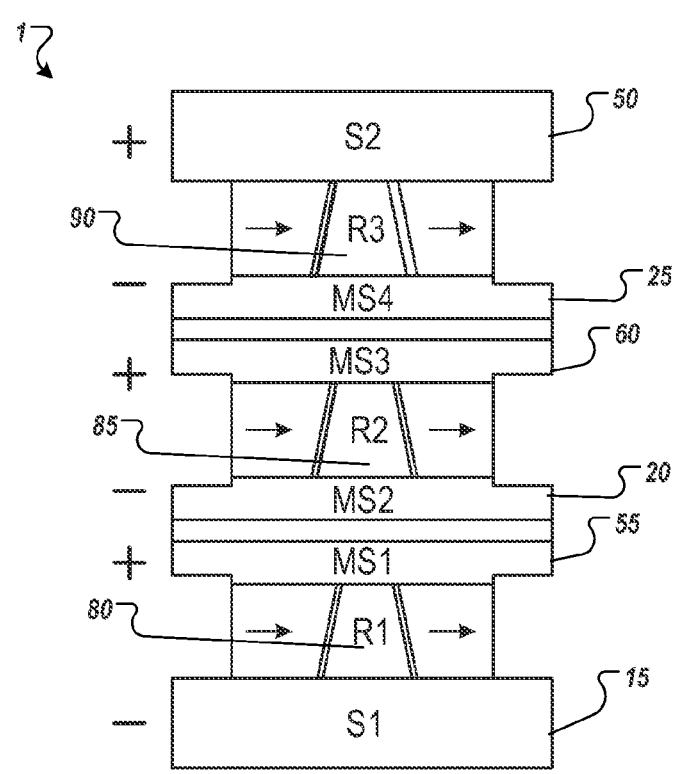
Figure 3:
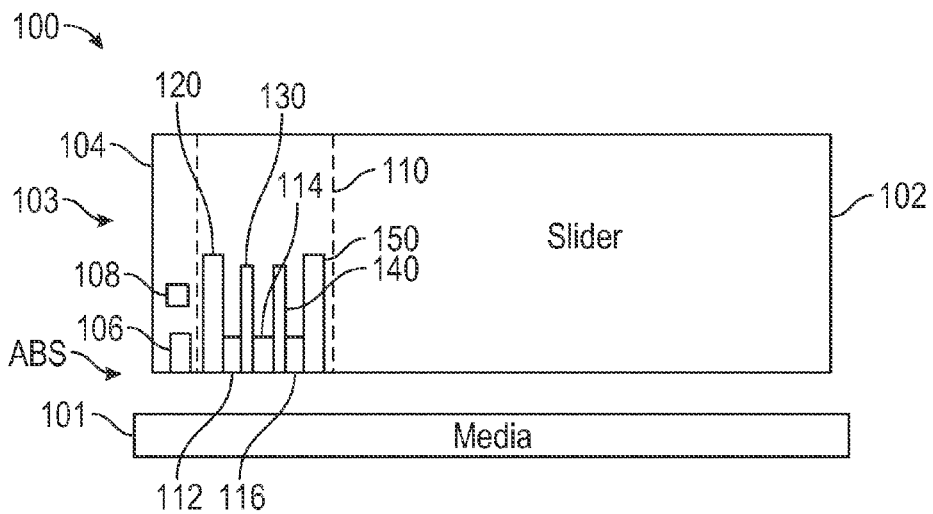
FIG. 3 is a schematic view illustrating an exemplary implementation of a disk drive.
Figure 4:
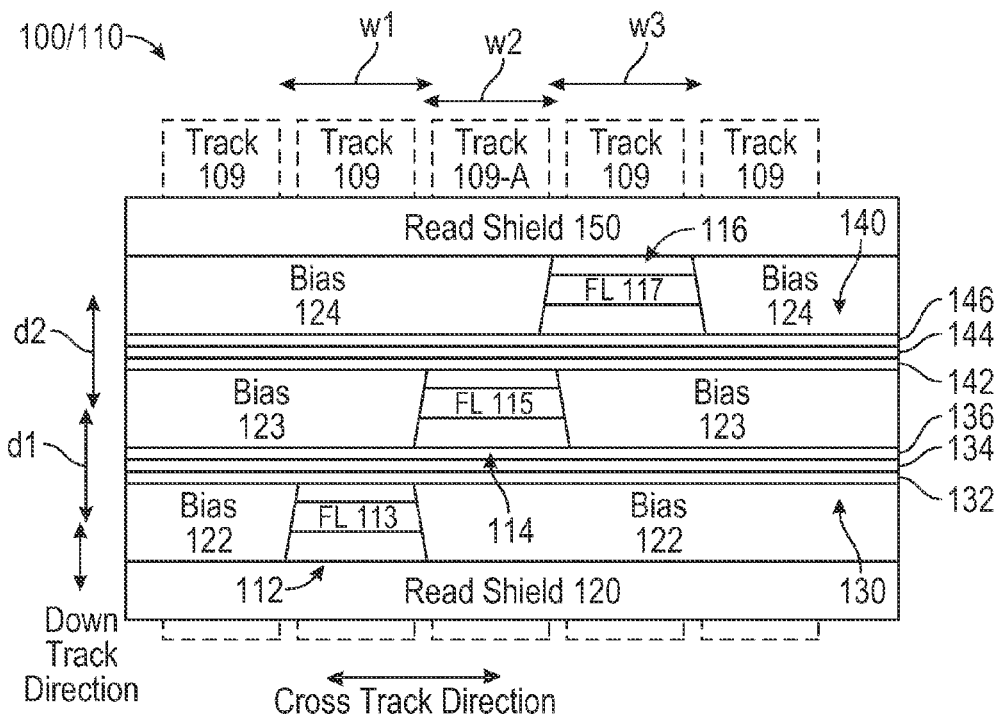
FIG. 4 is an ABS view illustrating an exemplary implementation of a portion of the two-dimensional read transducer.

FIGS. 3-4 depict side and Air Bearing Surface views of a storage drive or disk drive 100. For clarity, FIGS. 3 and 4 are not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components are shown. However, multiples of one or more of the components and/or their sub-components might be used.

The disk drive 100 includes media 101, a slider 102, a head 103 including a write transducer 104 and a read transducer 110. The media 101 includes tracks 109. The write transducer includes at least a write pole 106 and coil(s) 108 for energizing the pole 106. Additional and/or different components may be included in the disk drive 100. Although not shown, the slider 102, and thus the transducers 104 and 110 are generally attached to a suspension (not shown). The transducers 104 and 110 are fabricated on the slider 102 and include an ABS proximate to the media 101 during use. Although both a write transducer 104 and a read transducer 110 are shown, in other implementations, only a read transducer 110 may be present.

The read transducer 110 includes multiple read sensors 112, 114 and 116. The read sensors 112, 114 and 116 include sensor layers 113, 115 and 117, respectively, that may be free layers in a magneto resistive junction such as a tunneling magneto resistive (TMR) sensor (such as a current-perpendicular-to-plane (CPP) TMR sensor). As may be apparent to a person of ordinary skill in the art, other types of sensors (such as a giant magneto resistive (GMR) sensor) may also be used. Thus, each sensor 112, 114 and 116 may include a pinning layer, a pinned layer, a nonmagnetic spacer layer and a free layer 113, 115, and 117, respectively. For simplicity, only the free layers 113, 115 and 117 are separately labeled in FIG. 4. The sensors 112, 114 and 116 may also include seed layer(s) (not shown) and capping layer(s) (not shown). The pinning layer is generally an AFM layer that is magnetically coupled to the pinned layer. In other implementations, however, the pinning layer may be omitted or may use a different pinning mechanism. The free layers 113, 115 and 117 are each shown as a single layer, but may include multiple layers including but not limited to a synthetic antiferromagnetic (SAF) structure. The pinned layer may also be a simple layer or a multilayer. Although shown as extending the same distance from the ABS, the pinned layer may extend further than the corresponding free layer 113, 115, and/or 117, respectively. The nonmagnetic spacer layer may be a conductive layer, a tunneling barrier layer, or other analogous layer.

Although depicted as a GMR or TMR sensor, in other implementations, other structures and other sensing mechanisms may be used for the sensor.

The read sensors 112, 114 and 116 are separated by distances d1 and d2 in a down track direction. The down track direction is perpendicular to the cross track direction. The cross track direction and track width direction are the same. In the implementation shown, the distance d1 and d2 between the sensors 112 and 114 and between the sensors 114 and 116, respectively, are the same. However, in other implementations, the distances between the sensors 112, 114 and 116 may not be the same. It may generally be desirable to reduce the distance between the sensors 112, 114 and 116 to reduce the skew effect discussed above. In some implementations, the distances d1 and d2 may each be at least ten nanometers and not more than four hundred nanometers. The read sensors 112, 114 and 116 may have various widths, w1, w2 and w3, respectively, in the track width, or cross-track, direction. However, in other implementations, other widths are possible. The widths of the sensors 112, 114 and 116 may also be based on the track pitch. The track pitch is the distance from the center of one track to the center of the next track. Further, the widths may depend not only on the track pitch, but also on the distance between the sensors 112, 114 and 116.

The read sensors 112, 114 and 116 may also be displaced along the cross track direction. Therefore, the centers of each of the read sensors 112, 114 and 116 are not aligned along a vertical line that runs the down track direction. In the implementation shown, none of the read sensors 112, 114 and 116 are aligned along a vertical line that runs in the down track direction. In other implementations, some or all of the read sensors 112, 114 and 116 may be aligned. The read sensors 112, 114 and 116 may also partially overlap in the track width/cross track direction. However, in other implementations, the read sensors 112, 114 and 116 may be aligned.

Also shown are bias structures 122, 123 and 124 that magnetically bias the read sensors 112, 114 and 116, respectively. The magnetic bias structure(s) 122, 123 and/or 124 may be soft bias structures fabricated with soft magnetic material(s). In other implementations, the magnetic bias structure(s) 122, 123 and/or 124 may be hard magnetic bias structures. Other mechanisms for biasing the sensors 112, 114 and 116 might also be used.

The read sensors are separated by shields 130 and 140. The read sensors 112, 114 and 116 and mid-shields 130 and 140 are surrounded by read shields 120 and 150. Thus, as used herein, a mid-shield shield may be considered to be an internal shield, which is interleaved with read sensors 112, 114 and 116 and between the outer, read shields 120, 150. The outermost shields 120, 150 for the read transducer 110 are termed read shields. In the implementation shown in FIGS. 3 and 4, three read sensors 112, 114 and 116 and two internal shields 130 and 140 are shown. However, in another implementation, another number of read sensors 112, 114 and 116 and internal shields 130 and 140 may be present. The shields/read shields 120, 130, 140 and 150 generally include soft magnetic material. In some implementations, one or more of the shields 120, 130, 140 and 150 may include ferromagnetic layers that are anti-ferromagnetically coupled.

Current is driven perpendicular-to-plane for the sensors 112, 114 and 116. Thus, current is driven through the sensor 112 between the shields 120 and 130. Similarly, current is driven through the sensor 114 between the shields 130 and 140. Current is also driven through the sensor 116 between the shields 140 and 150. Thus, electrical connection is to be made to the shields 120, 130, 140 and 150. However, different currents may be desired to be driven through the sensors 112, 114 and 116. Similarly, the resistances of the sensors 112, 114 and 116 may be desired to be separately sensed. For example, the sensors 112, 114 and 116 may each be desired to be separately coupled to their own preamplifier (preamp). As a result, the sensors 112, 114 and 116 are desired to be electrically isolated from each other. Consequently, the shields 130 and 140 are configured to not only magnetically shield the sensors 112, 114 and 116, but also to provide electrical isolation. As a result, each middle shield 130 and 140 may include conductive magnetic layers separated by one or more insulating layers. Thus, the shield 130 may include conductive magnetic middle shield layers 132 and 136 that are separated by an insulating layer 134. In some embodiments, the insulating layer 134 may be considered a magnetic-spacer layer 134. Similarly, the shield 140 includes conductive magnetic middle shield layers 142 and 146 separated by a magnetic shield layer 144. However, example implementations are not limited to this configuration, and may include configurations without an insulating layer 134, 144 formed between the conductive magnetic middle shield layers 132/142, 136/146. Further, in some embodiments, the conductive magnetic layers 132/142/136/146 may be formed from a conductive metal and may be referred to as metallic middle shield layers.

Thus, the shields 130 and 140 may magnetically shield and electrically isolate the sensors 112, 114 and 116. However, without more, the capacitive coupling between the metallic middle shield layers 132 and 136 and the metallic middle shield layers 142 and 146 may adversely affect performance of the magnetic transducer 100. Consequently, a first electrical potential having a first polarity may be applied to the first and second metallic middle shield layers 132 and 136. Further, a second electrical potential having a second polarity, opposite the first polarity, may be applied to the third and fourth metallic middle shield layers 142 and 146. For example, a positive (+) polarity electrical potential may be applied to the first and second metallic middle shield layers 132 and 136, and a negative (−) polarity electrical potential may be applied to the third and fourth metallic middle shield layers 142 and 146. Of course in other implementations, the positive polarity (+) may be applied to the third and fourth metallic middle shield layers 142 and 146 and the negative (−) polarity may be applied to the first and second metallic middle shield layers 132 and 136. Structures to apply the first and second electrical potentials are discussed in greater detail below. In some implementations, the first and second electrical potentials may have the same magnitude or may have different magnitudes.

The insulating layer(s) 134 and/or 144 may also be configured to improve the performance of the shields 130 and/or 140, respectively. For example, a low dielectric constant material may be used for the insulating layers 134 and/or 144. A low dielectric constant material is one which has a dielectric constant less than eight. For example, SiO and/or SiOC might be used for the insulating layer(s) 134 and/or 144. As a result, capacitive coupling between the metallic middle shield layers 132 and 136 and/or the metallic middle shield layers 142 and 146 may be reduced. The thickness of the insulating layer(s) 134 and/or 144 may be varied. More specifically, the thickness of the insulating layer(s) 134 and/or 144 may be increased distal from the sensors 112, 114 and 116. In some implementations, the insulating layer 134 and 144 may be on the order of ten nanometers within five microns of the sensors 112, 114 and 116. Further from the sensors 112, 114 and 116, the thickness may be increased, for example to twenty nanometers. In addition, the material(s) may be changed further from the sensors 112, 114 and 116. For example, the insulating layer 134 may include a ten nanometer thick alumina sub-layer having a dielectric constant of approximately six. At least five microns from the sensors an additional sub-layer of silicon dioxide having a thickness of approximately ten nanometers with a dielectric constant of approximately three may be added. Thus, the insulating layer(s) 134 and/or 144 may have varying thicknesses and/or materials.

The read transducer 110 may be used in higher density recording, such as TDMR. Through the placement of the sensors 112, 114 and 116, the transducer 110 may address skew issues that might otherwise adversely affect performance of the transducer 110. Consequently, the impedance and response of the transducer 110 may be sufficient for higher frequency performance. Cross talk may thus be reduced. In addition, the effect on the magnetics and other aspects of the transducer 110 because of the reduced overlap may be mitigated by the configuration of the shields 130 and 140. Performance of the magnetic transducer 110 may thus be improved.

Figure 6:
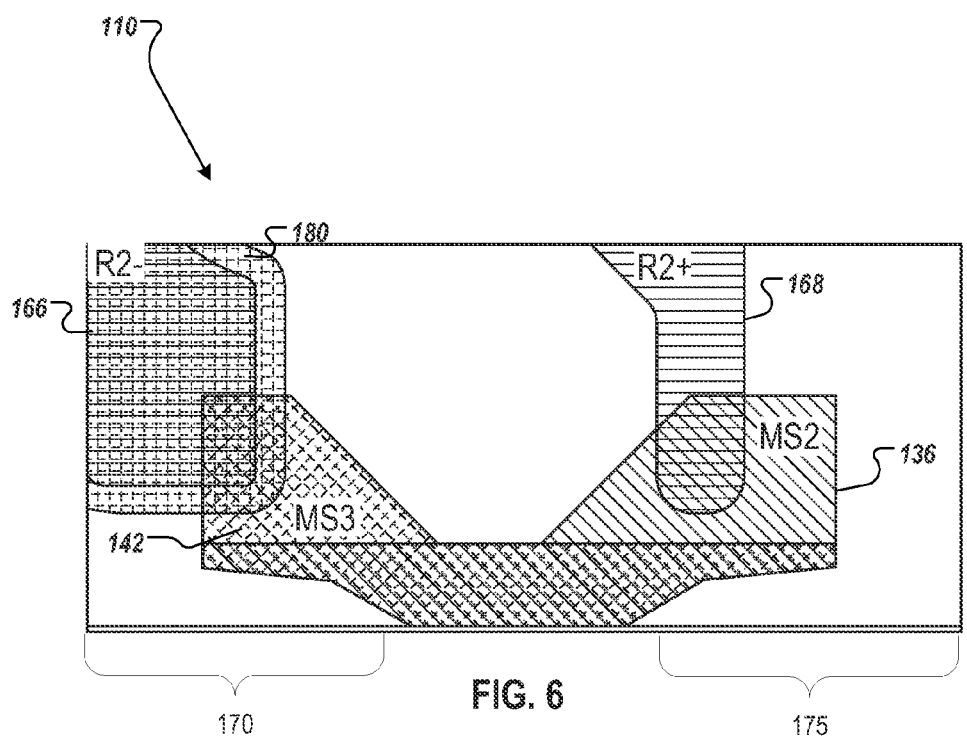
Figure 7:
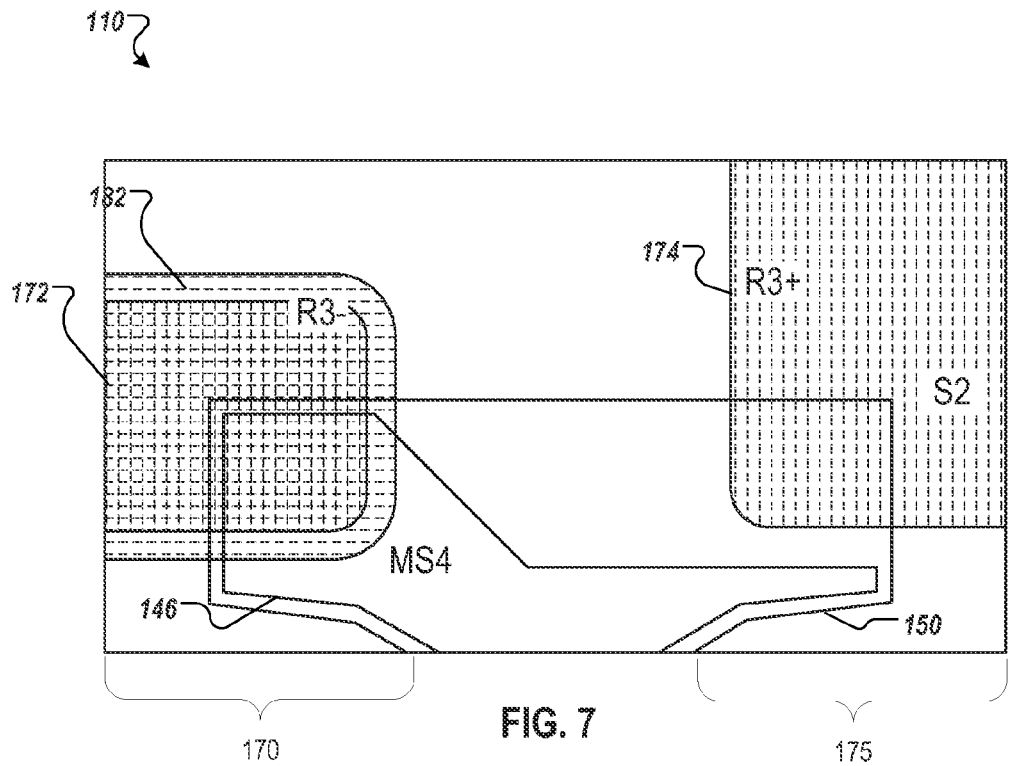
Figure 8:
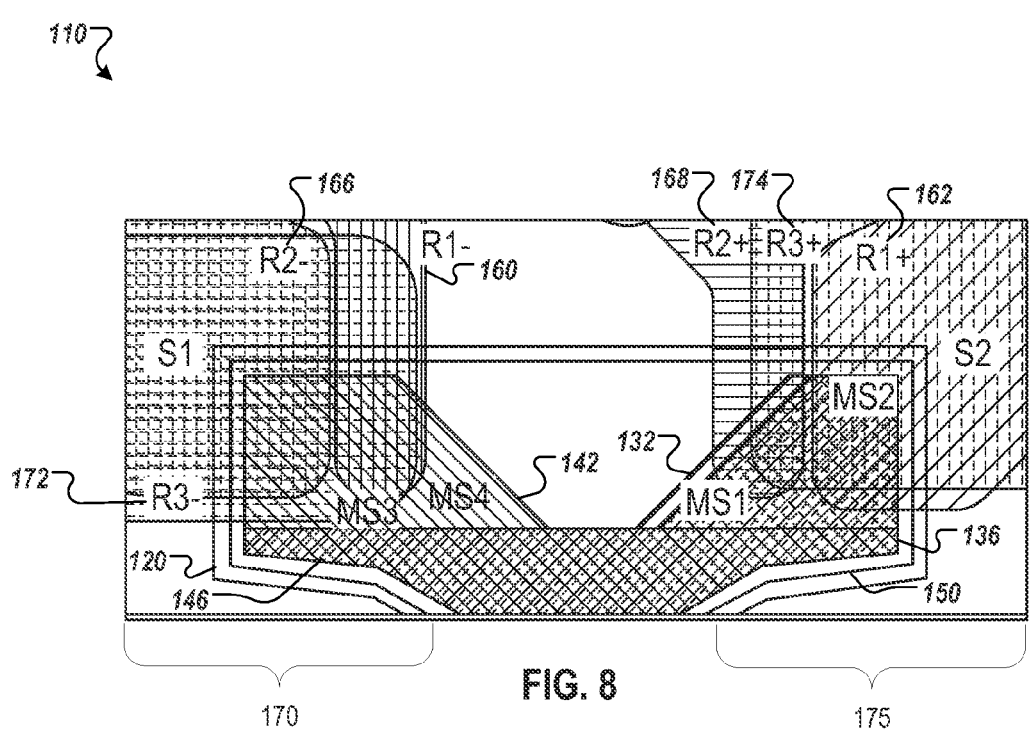

FIGS. 5-8 depict plan views of an exemplary implementation of a portion of the two-dimensional read transducer 110 showing overlap and contacts. For clarity, FIGS. 5-8 are not to scale. For simplicity, only a portion of the layers of the read transducer 110 is shown in each of FIGS. 5-7. All layers of the transducer 110 are shown in FIG. 8.

Figure 5:
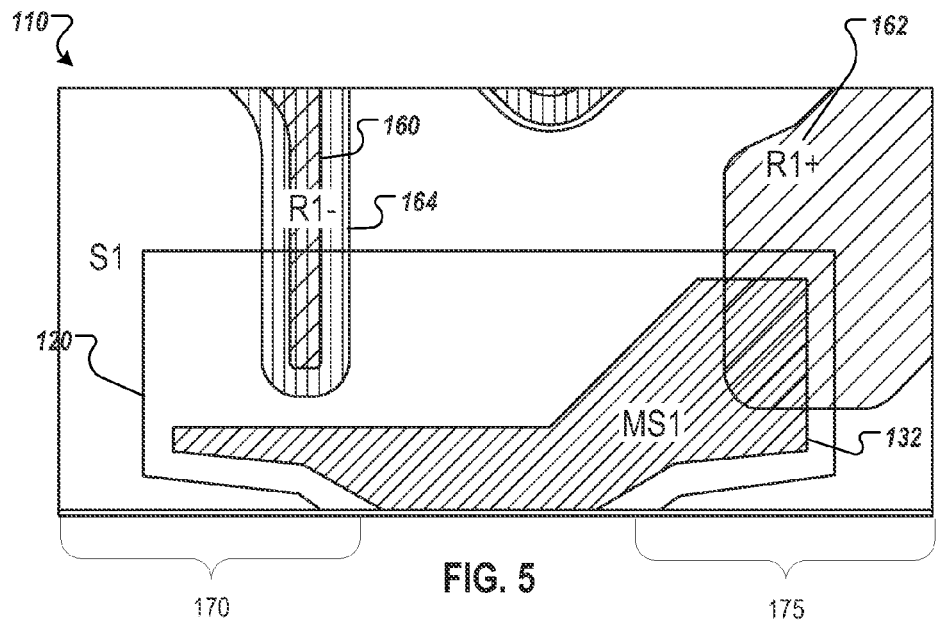
FIGS. 5-8 are plan views illustrating portions of the exemplary implementation of the two-dimensional read transducer.

FIG. 5 illustrates the layers around the first read sensor (R1) 112. In FIG. 5, the positive terminal 160 and negative terminal 162 of the first read sensor 112, the first (lower) shield layer 120, and the first metallic middle shield layer 132 of the transducer 110 are illustrated. As illustrated, the negative terminal 160 (R1−) associated with the first read sensor 112 (not illustrated in FIG. 5) is formed on one side 170 of the transducer 110 and a positive terminal associated with the first read sensor (R1+) 162 is formed on a second, opposite side 175 of the transducer 110.

Further, the negative terminal 160 of the first read sensor is formed over an electrical contact 164 as additional conductive material deposited over a portion of the electrical contact 164. The electrical contact 164 may overlap the first shield (S1) 120, on the first side 170 of the transducer 110. The electrical contact 164 provides an electrical potential having a negative polarity to the first shield (S1) 120.

Additionally, the first metallic middle shield layer 132 overlaps the positive terminal 162 (R+) of the first read sensor (112 in other FIGS.; not illustrated in FIG. 5) on the second side 175 of the transducer 110. This overlap provides an electrical potential having a positive polarity to the first metallic middle shield layer 132. Although depicted as simple layers, the first shield layer 120 and the first metallic middle shield layer 132 may be multilayered structures. Such a multilayer may include but not be limited to anti-ferromagnetically coupled magnetic layers interleaved with nonmagnetic spacer layer(s).

FIG. 6 illustrates the layers around the second read sensor (R2) 114. In FIG. 6, the positive terminal 168 and negative terminal 166 of the second read sensor 114, the second metallic middle shield layer 136, and the third metallic middle shield layer 142 of the transducer 110 are illustrated. As illustrated, the negative terminal 166 (R2−) associated with the second read sensor 114 (not illustrated in FIG. 6) is formed on the one side 170 of the transducer 110 and the positive terminal associated with the second read sensor (R2+) 162 is formed on the second, opposite side 175 of the transducer 110.

Further, an electrical contact 180 surrounds the negative terminal 166 of the second read sensor, and overlaps the third metallic middle shield layer (MS3) 142, on the first side 170 of the transducer 110. The electrical contact 180 provides an electrical potential having a negative polarity to the third metallic middle shield layer (MS3) 142.

Additionally, the second metallic middle shield layer (MS2) 136 overlaps the positive terminal 168 (R+) of the second read sensor (112 in other FIGS.; not illustrated in FIG. 6) on the second side 175 of the transducer 110. This overlap provides an electrical potential having a positive polarity to the second metallic middle shield layer (MS2) 136. Although depicted as simple layers, the second metallic middle shield layer (MS2) 136 and the third metallic middle shield layer (MS3) 132 may be multilayered structures. Such a multilayer structure may include but not be limited to anti-ferromagnetically coupled magnetic layers interleaved with nonmagnetic spacer layer(s).

FIG. 7 illustrates the layers around the third read sensor (R3) 116. In FIG. 7, the positive terminal 174 and negative terminal 172 of the third read sensor 116, the fourth metallic middle shield layer 146, and the second shield 150 of the transducer 110 are illustrated. As illustrated, the negative terminal 172 (R3−) associated with the third read sensor 116 (not illustrated in FIG. 7) is formed on the one side 170 of the transducer 110 and the positive terminal associated with the third read sensor (R3+) 174 is formed on the second, opposite side 175 of the transducer 110.

Further, an electrical contact 182 surrounds the negative terminal 172 of the third read sensor, and overlaps the fourth metallic middle shield layer (MS4) 146, on the first side 170 of the transducer 110. The electrical contact 182 provides an electrical potential having a negative polarity to the third metallic middle shield layer (MS4) 146.

Additionally, the second (upper) shield (S2) 150 overlaps the positive terminal 174 (R+) of the third read sensor (116 in other FIGS.; not illustrated in FIG. 7) on the second side 175 of the transducer 110. This overlap provides an electrical potential having a positive polarity to the second shield (S2) 150. Although depicted as simple layers, the fourth metallic middle shield layer (MS4) 146 and the second shield (S2) 150 may be multilayered structures. Such a multilayer structure may include but not be limited to anti-ferromagnetically coupled magnetic layers interleaved with nonmagnetic spacer layer(s).

FIG. 8 illustrates all of the above discussed layers of the transducer 110 overlaid. As illustrated, the first (lower) shield 120, third metallic middle shield layer 142, and the fourth metallic middle shield layer 146 all overlap on the first side 170 of the transducer 110 and can be provided with the same electrical polarity (i.e. negative polarity). Further, the second (upper shield) 150, the first metallic middle shield layer 132, and the second metallic middle shield layer 136 all overlap on the second side 175 of the transducer 110 and provided with the same electrical polarity (i.e. positive polarity). However, example implementations are not limited to this configuration and may include other configurations that may be apparent to a person of ordinary skill in the art. For example, a positive polarity may be applied to the first (lower) shield 120, third metallic middle shield layer 142, and the fourth metallic middle shield layer 146 and a negative polarity may be applied to second (upper shield) 150, the first metallic middle shield layer 132, and the second metallic middle shield layer 136.

Figure 9:
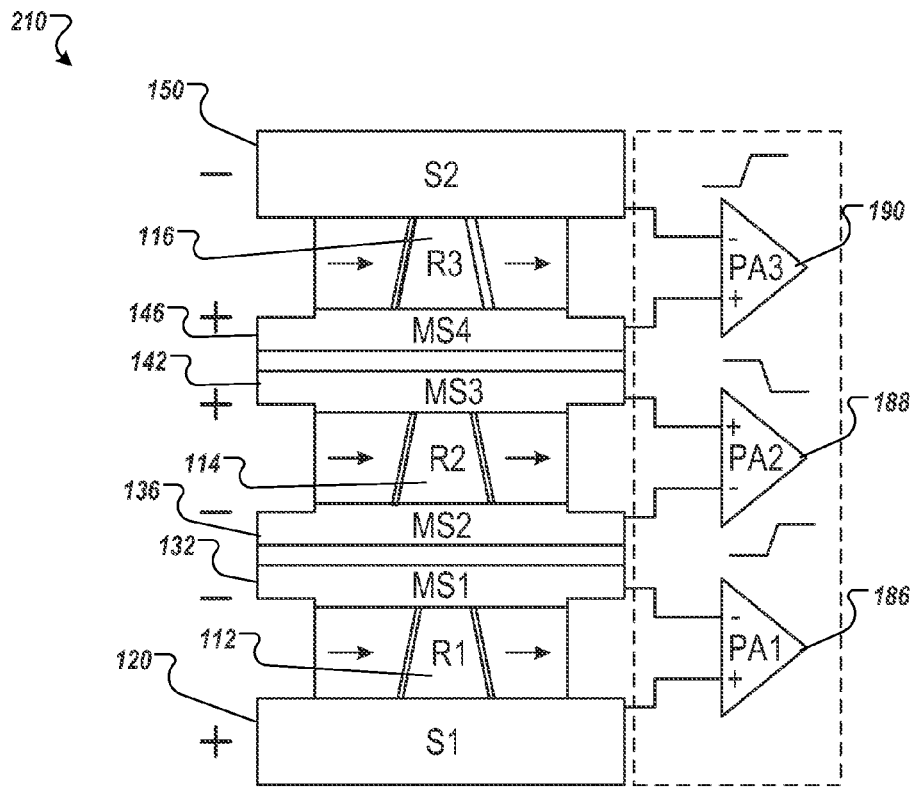
FIGS. 9 and 10 are schematic views of a second exemplary implementation of a two-dimensional read transducer.
Figure 10:
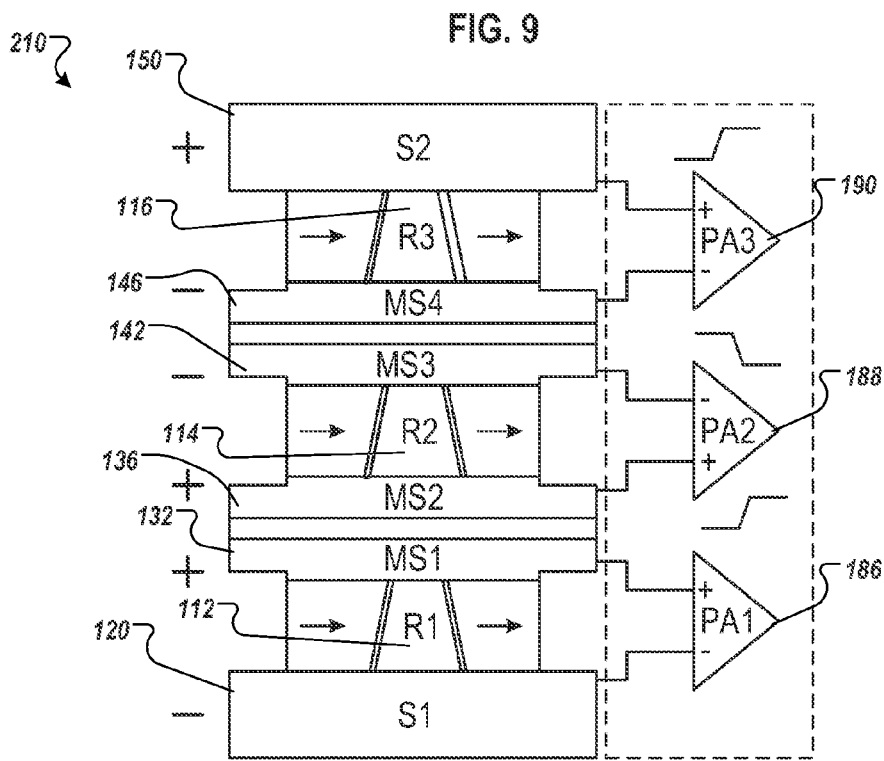

FIGS. 9 and 10 are schematic views of a second exemplary implementation of a two-dimensional read transducer 210. The two-dimensional read transducer 210 has features similar to those discussed above with respect to the two-dimensional read transducer 110 illustrated in FIGS. 3-8 and like reference numerals have been used to illustrate similar features in FIGS.

9 and 10. FIG. 9 illustrates a first configuration of the second exemplary implementation of the two-dimensional read transducer 210. As illustrated, the first (lower) shield layer (S1) 120, the first read sensor (R1) 112, the first metallic middle shield layer (MS1) 132, the second metallic middle shield layer (MS2) 136, the second read sensor (R2) 114, the third metallic middle shield layer (MS3) 142, the fourth metallic middle shield layer (MS4) 146, the third read sensor (R3) 116, and the second (upper) shield layer (S2) 150 are layered in sequence from bottom to top. Further, a first preamp (PA1) 186 is electrically connected to both the first (lower) shield layer (S1) 120 and the first metallic middle shield layer (MS1) 132. Additionally, a second preamp (PA2) 188 is electrically connected to both the second metallic middle shield layer (MS2) 136 and the third metallic middle shield layer (MS3) 142. Further, a third preamp (PA3) 190 is electrically connected to both the fourth metallic middle shield layer (MS4) 146 and the second (upper) shield layer (S2) 150.

In the first configuration illustrated in FIG. 9, the first preamp (PA1) 186 is configured to provide an electrical potential between the first (lower) shield (S1) 120 and the first metallic middle shield layer (MS1) 132 such that a positive polarity is applied to the first (lower) shield (S1) 120 and a negative polarity is applied to the first metallic middle shield layer (MS1) 136. Further, the second preamp (PA2) 188 is configured to provide an electrical potential between the second metallic middle shield layer (MS2) 136 and the third metallic middle shield layer (MS3) 142 such that a positive polarity is applied to the third metallic middle shield layer (MS3) 142 and a negative polarity is applied to the second metallic middle shield layer (MS2) 132. Additionally, the third preamp (PA3) 190 is configured to provide an electrical potential between the fourth metallic middle shield layer (MS4) 146 and the second (upper) shield (S2) 150 such that a positive polarity is applied to the fourth metallic middle shield layer (MS4) 146 and a negative polarity is applied to the second (upper) shield (S2) 150.

FIG. 10 illustrates a second configuration of the second exemplary implementation of the two-dimensional read transducer 210 that is structurally similar to the first configuration illustrated in FIG. 9. Specifically, FIG. 10 also illustrates the first (lower) shield layer (S1) 120, the first read sensor (R1) 112, the first metallic middle shield layer (MS1) 132, the second metallic middle shield layer (MS2) 136, the second read sensor (R2) 114, the third metallic middle shield layer (MS3) 142, the fourth metallic middle shield layer (MS4) 146, the third read sensor (R3) 116, and the second (upper) shield layer (S2) 150 are layered in sequence from bottom to top. Further, the first preamp (PA1) 186 is electrically connected to both the first (lower) shield layer (S1) 120 and the first metallic middle shield layer (MS1) 132. Additionally, the second preamp (PA2) 188 is electrically connected to both the second metallic middle shield layer (MS2) 136 and the third metallic middle shield layer (MS3) 142. Further, the third preamp (PA3) 190 is electrically connected to both the fourth metallic middle shield layer (MS4) 146 and the second (upper) shield layer (S2) 150.

However, in the second configuration illustrated in FIG. 10, the first preamp (PA1) 186, second preamp (PA2) 188, and third preamp (PA3) 190 are configures to provide opposite polarities to the respective layers from the first configuration illustrated in FIG. 9. Specifically, the first preamp (PA1) 186 is configured to provide a negative polarity to the first (lower) shield (S1) 120 and a positive polarity to the first metallic middle shield layer (MS1) 132. Further, the second preamp (PA2) 188 is configured to provide a negative polarity to the third metallic middle shield layer (MS3) 142 and a positive polarity to the second metallic middle shield layer (MS2) 136. Additionally, the third preamp (PA3) 190 is configured to provide a negative polarity to the fourth metallic middle shield layer (MS4) 146 and a positive polarity to the second (upper) shield (S2) 150.

Figure 11:
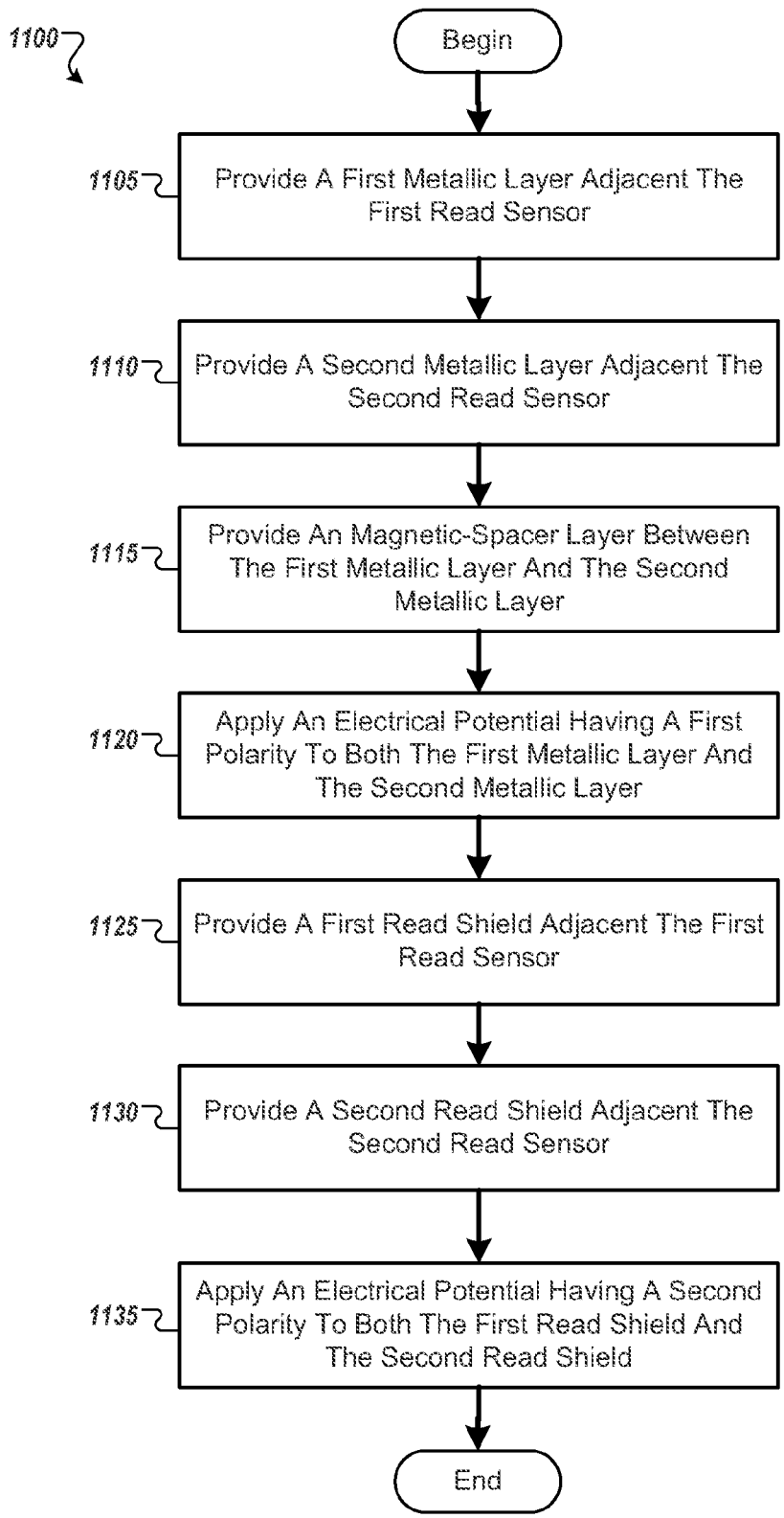
FIG. 11 is a flow chart illustrating an exemplary implementation of a method for reducing crosstalk between a first read sensor and a second read sensor.

FIG. 11 is an exemplary implementation of a method 1100 for reducing cross-talk between read sensors in a multi-read sensor transducer. For simplicity, some steps may be omitted, interleaved, and/or combined. The method 1100 is also described in the context of providing a single recording transducer having two read sensors. However, the method 1100 may be used to form a portion or a complete two-dimensional transducer, such as TDMR transducers 110, 210 illustrated in FIGS. 3-10. Further, the method 1100 may also be used to fabricate multiple transducers at substantially the same time. The method 1100 may also be used to fabricate other transducers, as may be apparent to a person of ordinary skill in the art. The method 1100 is also described in the context of particular layers. A particular layer may include multiple materials and/or multiple sub-layers. The method 1100 also may start after formation of other portions of the magnetic recording transducer.

In 1105, a first metallic middle-shield layer 132 is provided adjacent a first read sensor 112. The metal of the first middle shield layer 132 may generally be a soft-magnetic material including, but not limited to, Iron alloys, Nickel alloys, or any other soft-magnetic metal that may be apparent to a person of ordinary skill in the art. Further, the application process of the first middle shield layer 132 is not particularly limited and may include any process that may be apparent to a person of ordinary skill in the art include sputtering or any other known process. Further, in 1110, a second metallic middle-shield layer 136 is provided adjacent a second read sensor 114. The metal of the second middle-shield layer 136 may also generally be a soft-magnetic material including, but not limited to, Iron alloys, Nickel alloys, or any other soft-magnetic metal that may be apparent to a person of ordinary skill in the art. Further, the application process of the second middle-shield layer 136 is not particularly limited and may include any process that may be apparent to a person of ordinary skill in the art include sputtering or any other known process.

In 1115, a magnetic-spacer layer 134 is provided between the first metallic middle shield layer 132 and the second metallic middle shield layer 136. The magnetic-spacer layer 134 may be formed from a magnetic isolating material including, but not limited to, a non-magnetic metal, such a ruthenium, or any other magnetic isolating material that may be apparent to a person of ordinary skill in the art. Further, the application process of the magnetic-spacer layer 134 is not particularly limited and may include any process that may be apparent to a person of ordinary skill in the art include vapor deposition, sputtering or any other known process.

In 1120, an electrical potential having a first polarity is applied to both the first metallic middle shield layer 132 and the second metallic middle shield layer 136. The electrical potential having the first polarity may be applied by providing a common electrical contact electrically connecting the first metallic middle shield layer 132 and the second metallic middle shield layer 136 in some implementations. Additionally and/or alternatively, in some implementations a first Preamp 186 and a second Preamp 188 may be electrically connected to the first metallic middle shield layer 132 and the second metallic middle shield layer 136, respectively, and may be configured to provide the electrical potential having the first polarity to the first metallic middle shield layer 132 and the second metallic middle shield layer 136.

Optionally, a first read shield layer 120 is provided adjacent the first read sensor 112 on a side of the first read sensor opposite the first metallic middle shield layer 132 in 1125. The first read shield layer 120 may generally be formed from a soft-magnetic material including, but not limited to, Iron alloys, Nickel alloys, or any other soft-magnetic metal that may be apparent to a person of ordinary skill in the art. Further, the application process of the first read shield layer 120 is not particularly limited and may include any process that may be apparent to a person of ordinary skill in the art include sputtering or any other known process.

Further, in 1130, a second read shield layer (third metallic middle shield layer 142) may optionally be provided adjacent the first read sensor 112 on a side of the first read sensor opposite the second metallic middle shield layer 136. In implementations having 3 or more read sensors, the second read shield layer (third metallic middle shield layer 142) may be considered or referred to as a third metallic middle shield layer 142 as illustrated in FIGS. 3-10. The second read shield layer (third metallic middle shield layer 142) may generally be formed from a soft-magnetic material including, but not limited to, Iron alloys, Nickel alloys, or any other soft-magnetic metal that may be apparent to a person of ordinary skill in the art. Further, the application process of the second read shield layer (third metallic middle shield layer 142) is not particularly limited and may include any process that may be apparent to a person of ordinary skill in the art include sputtering or any other known process.

In 1135, an electrical potential having a second polarity, which is opposite the first polarity, may optionally be applied to both the first read shield 120 and the second read shield (third metallic middle shield layer 142). In some implementations, the electrical potential having the second polarity may optionally also have the same magnitude as the electrical potential having the first polarity. The electrical potential having the second polarity may be applied by providing a common electrical contact electrically connecting the first read shield 120 and the second read shield (third metallic middle shield layer 142) in some implementations. Additionally and/or alternatively, in some implementations the first Preamp 186 and the second Preamp 188 may be electrically connected to the first read shield 120 and the second read shield (third metallic middle shield layer 142), respectively, and may be configured to provide the electrical potential having the second polarity to the first read shield 120 and the second read shield (third metallic middle shield layer 142).

By providing an electrical potential having a first polarity to both the metallic middle shield layer layers located between adjacent read sensors may reduce cross-talk between the adjacent read sensors and allow for a reduction in the isolation thickness in a multiple sensor array in some example implementations. However, example implementations need not have any potential reduction in cross-talk or reduction in required isolation thickness, or any other effect.

The foregoing detailed description has set forth various implementations of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof.

While certain implementations have been described, these implementations have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

We claim:

1. A read transducer comprising:
   a first read sensor;
   a second read sensor disposed in a down track direction from the first read sensor; and
   a first middle shield disposed between the first read sensor and the second read sensor, the first middle shield including
      a first metallic middle shield layer disposed between the first read sensor and the second read sensor;
      a second metallic middle shield layer disposed between the first metallic middle shield layer and the second read sensor; and
      a first magnetic-spacer layer disposed between the first metallic middle shield layer and the second metallic middle shield layer,
   wherein the first metallic middle shield layer and the second metallic middle shield layer have substantially the same polarity.

2. The read transducer according to claim 1, further comprising:
   a first read shield; and
   a second read shield disposed in a down track direction from the first read shield,
   wherein the first read sensor, the first middle shield, and the second read sensor are disposed between the first read shield and the second read shield, and
   wherein both the first read shield and the second read shield have a polarity opposite the polarity of the first metallic middle shield layer and the second metallic middle shield layer.

3. The read transducer according to claim 1, further comprising:
   a first preamp electrically connected to the first metallic middle shield layer; and
   a second preamp electrically connected to the second metallic middle shield layer,
   wherein the first preamp and the second preamp are configured to provide substantially the same polarity to the first metallic middle shield layer and the second metallic middle shield layer respectively.

4. The read transducer according to claim 1, further comprising:
   a first electrical contact provided on a first side of the read transducer, the first electrical contact electrically connected to the first metallic middle shield layer; and
   a second electrical contact provided on the first side of the read transducer, the second electrical contact overlapping the first electrical contact and electrically connected to the second metallic middle shield layer,
   wherein the first electrical contact and the second electrical contact have a first polarity provided to the first side of the read transducer.

5. The magnetic read transducer according to claim 1, further comprising:
   a third read sensor disposed in a down track direction from the second read sensor; and
   a second middle shield disposed between the second read sensor and the third read sensor, the second middle shield including a third metallic middle shield layer disposed between the second read sensor and the third read sensor;

a fourth metallic middle shield layer disposed between the third metallic middle shield layer and the third read sensor; and a second magnetic-spacer layer disposed between the third metallic middle shield layer and the fourth metallic middle shield layer, wherein the second metallic middle shield layer and the third metallic middle shield layer have opposite polarities; and wherein the third metallic middle shield layer and the fourth metallic middle shield layer have substantially the same polarity.

6. The read transducer according to claim 5, further comprising:

a first read shield; and a second read shield disposed in a down track direction from the first read shield, wherein the first read sensor, the first middle shield, the second read sensor, the second middle shield, and the third read sensor are disposed between the first read shield and the second read shield, and wherein the first read shield has a polarity opposite the polarity of the first metallic middle shield layer of the first middle shield and the second metallic middle shield layer of the first middle shield; and wherein the second read shield has a polarity opposite the polarity of the third metallic middle shield layer of the second middle shield and the fourth metallic middle shield layer of the second middle shield.

7. The read transducer according to claim 5, further comprising:

a first preamp electrically connected to the first metallic middle shield layer of the first middle shield;

a second preamp electrically connected to the second metallic middle shield layer of the first middle shield and the third metallic middle shield layer of the second middle shield;

a third preamp electrically connected to the fourth metallic middle shield layer of the second middle shield, wherein the first preamp and the second preamp are configured to provide substantially the same polarity to the first metallic middle shield layer of the first middle shield and the second metallic middle shield layer of the first middle shield, respectively; and wherein the second preamp and the third preamp are configured to provide substantially the same polarity to the third metallic middle shield layer of the second middle shield and the fourth metallic middle shield layer of the second middle shield, respectively.

8. The read transducer according to claim 5, further comprising:

a first electrical contact provided on a first side of the read transducer, the first electrical contact electrically connected to the first metallic middle shield layer of the first middle shield;

a second electrical contact provided on the first side of the read transducer, the second electrical contact overlapping the first electrical contact and electrically connected to the second metallic middle shield layer of the first middle shield;

a third electrical contact provided on a second side of the read transducer opposite the first side of the read transducer, the third electrical contact electrically connected to the third metallic middle shield layer of the second middle shield;

a fourth electrical contact provided on the second side of the read transducer, the fourth electrical contact overlapping the third electrical contact and electrically connected to the fourth metallic middle shield layer of the second middle shield, wherein the first electrical contact and the second electrical contact have a first polarity provided to the first side of the read transducer; and wherein the third electrical contact and the fourth electrical contact have a second polarity provided to the second side of the read transducer, the second polarity being an opposite polarity from the first polarity.

9. A storage drive comprising:

a media;

a slider movable relative to the media, the slider including
a read transducer having:
a first read sensor;
a second read sensor disposed in a down track direction from the first read sensor; and
a first middle shield disposed between the first read sensor and the second read sensor, the first middle shield including
a first metallic middle shield layer disposed between the first read sensor and the second read sensor;
a second metallic middle shield layer disposed between the first metallic middle shield layer and the second read sensor; and
a first magnetic-spacer layer disposed between the first metallic middle shield layer and the second metallic middle shield layer,
wherein the first metallic middle shield layer and the second metallic middle shield layer have substantially the same polarity.

10. The storage drive according to claim 9, further comprising:

a first read shield; and a second read shield disposed in a down track direction from the first read shield, wherein the first read sensor, the first middle shield, and the second read sensor are disposed between the first read shield and the second read shield, and wherein both the first read shield and the second read shield have a polarity opposite the polarity of the first metallic middle shield layer and the second metallic middle shield layer.

11. The storage drive according to claim 9, further comprising:

a first preamp electrically connected to the first metallic middle shield layer; and a second preamp electrically connected to the second metallic middle shield layer, wherein the first preamp and the second preamp are configured to provide substantially the same polarity to the first metallic middle shield layer and the second metallic middle shield layer respectively.

12. The storage drive according to claim 9, further comprising:

a first electrical contact provided on a first side of the read transducer, the first electrical contact electrically connected to the first metallic middle shield layer; and a second electrical contact provided on the first side of the read transducer, the second electrical contact overlapping the first electrical contact and electrically connected to the second metallic middle shield layer, wherein the first electrical contact and the second electrical contact have a first polarity provided to the first side of the read transducer.

13. The storage drive according to claim 9, further comprising:
- a third read sensor disposed in a down track direction from the second read sensor; and
- a second middle shield disposed between the second read sensor and the third read sensor, the second middle shield including
  - a third metallic middle shield layer disposed between the second read sensor and the third read sensor;
  - a fourth metallic middle shield layer disposed between the third metallic middle shield layer and the third read sensor; and
  - a second magnetic-spacer layer disposed between the third metallic middle shield layer and the fourth metallic middle shield layer,
- wherein the second metallic middle shield layer and the third metallic middle shield layer have opposite polarities; and
- wherein the third metallic middle shield layer and the fourth metallic middle shield layer have substantially the same polarity.

14. The storage drive according to claim 13, further comprising:
- a first read shield; and
- a second read shield disposed in a down track direction from the first read shield,
- wherein the first read sensor, the first middle shield, the second read sensor, the second middle shield, and the third read sensor are disposed between the first read shield and the second read shield, and
- wherein the first read shield has a polarity opposite the polarity of the first metallic middle shield layer of the first middle shield and the second metallic middle shield layer of the first middle shield; and
- wherein the second read shield has a polarity opposite the polarity of the third metallic middle shield layer of the second middle shield and the fourth metallic middle shield layer of the second middle shield.

15. The storage drive according to claim 13, further comprising:
- a first preamp electrically connected to the first metallic middle shield layer of the first middle shield;
- a second preamp electrically connected to the second metallic middle shield layer and the third metallic middle shield layer of the first middle shield;
- a third preamp electrically connected to the fourth metallic middle shield layer of the second middle shield,
- wherein the first preamp and the second preamp are configured to provide substantially the same polarity to the first metallic middle shield layer of the first middle shield and the second metallic middle shield layer of the first middle shield respectively; and
- wherein the second preamp and the third preamp are configured to provide substantially the same polarity to the third metallic middle shield layer of the second middle shield and the fourth metallic middle shield layer of the second middle shield respectively.

16. The storage drive according to claim 13, further comprising:
- a first electrical contact provided on a first side of the read transducer, the first electrical contact electrically connected to the first metallic middle shield layer of the first middle shield;
- a second electrical contact provided on the first side of the read transducer, the second electrical contact overlapping the first electrical contact and electrically connected to the second metallic middle shield layer of the first middle shield;
- a third electrical contact provided on a second side of the read transducer opposite the first side of the read transducer, the third electrical contact electrically connected to the third metallic middle shield layer of the second middle shield;
- a fourth electrical contact provided on the second side of the read transducer, the fourth electrical contact overlapping the third electrical contact and electrically connected to the fourth metallic middle shield layer of the second middle shield,
- wherein the first electrical contact and the second electrical contact have a first polarity provided to the first side of the read transducer; and
- wherein the third electrical contact and the fourth electrical contact have a second polarity provided to the second side of the read transducer, the second polarity being an opposite polarity from the first polarity.

17. A method of reducing crosstalk between a first read sensor and a second read sensor disposed in a down track direction from the first read sensor in a read transducer of a storage drive, the method comprising:
- providing a first metallic middle shield layer adjacent the first read sensor, the first metallic middle shield layer being disposed between the first read sensor and the second read sensor;
- providing a second metallic middle shield layer adjacent the second read sensor, the second metallic middle shield layer being disposed between the first read sensor and the second read sensor;
- providing a magnetic-spacer layer between the first metallic middle shield layer and the second metallic middle shield layer; and
- applying an electrical potential having a first polarity to both the first metallic middle shield layer and second metallic middle shield layer.

18. The method of claim 17, further comprising:
- providing a first preamp electrically connected to the first metallic middle shield layer; and
- providing a second preamp electrically connected to the second metallic middle shield layer,
- wherein applying an electrical potential having the first polarity to both the first metallic middle shield layer and the second metallic middle shield layer comprises applying the electrical potential having the first polarity to the first preamp and to the second preamp.

19. The method of claim 17, further comprising:
- providing a first electrical contact connected to the first metallic middle shield layer; and
- providing a second electrical contact connected to the second metallic middle shield layer,
- wherein applying an electrical potential having the first polarity to both the first metallic middle shield layer and the second metallic middle shield layer comprises applying the electrical potential having the first polarity to the first electrical contact and to the second electrical contact.

20. The method of claim 17, further comprising:
- providing a first read shield adjacent the first read sensor, the first read sensor being positioned between the first read shield and the first metallic middle shield layer;
- providing a second read shield adjacent the second read sensor, the second read sensor being positioned between the second read shield and the second metallic middle shield layer; and applying an electrical potential having a second polarity to the first read shield and the second read shield, the second polarity being opposite the first polarity of the first metallic middle shield layer and the second metallic middle shield layer.

* * * * *